(12) United States Patent
Ko

(10) Patent No.: US 6,349,003 B1
(45) Date of Patent: Feb. 19, 2002

(54) CAMERA WITH MANUALLY OPERATED ZOOM LENS

(75) Inventor: Chi Yin Ko, Kowloon (HK)

(73) Assignee: The Tiffen Company LLC, Hauppauge, NY (US)

( * ) Notice: Subject to any disclaimer, the term of this patent is extended or adjusted under 35 U.S.C. 154(b) by 0 days.

(21) Appl. No.: 09/612,901

(22) Filed: Jul. 10, 2000

(51) Int. Cl.⁷ .............................................. G02B 15/14
(52) U.S. Cl. ...................... 359/694; 359/676; 359/700; 359/703; 396/71; 396/83; 396/144
(58) Field of Search .................. 359/694, 695, 359/699, 700, 701, 703, 706, 676; 396/71, 72, 79, 83, 85, 144, 331, 324

(56) References Cited

U.S. PATENT DOCUMENTS

| 4,000,501 A | * | 12/1976 | Sakaguchi et al. ............. 396/83 |
| 5,077,569 A | * | 12/1991 | Notagashira et al. ......... 396/71 |
| 5,335,030 A | | 8/1994 | Suzuka |
| 5,587,754 A | * | 12/1996 | Katayama et al. ........... 396/144 |
| 6,072,639 A | * | 6/2000 | Onda .......................... 359/694 |
| 6,236,519 B1 | * | 5/2001 | Oka ............................. 359/700 |
| 6,236,523 B1 | * | 5/2001 | Iikawa et al. ................ 359/694 |

* cited by examiner

Primary Examiner—Loha Ben
(74) Attorney, Agent, or Firm—Howell & Haferkamp L.C.

(57) ABSTRACT

A camera having a manually operated zoom lens system, in which the magnification of the lens system is adjusted by manual rotation of a part of the lens systems. The camera includes a lens system having at least first and second optical elements, the first optical element being movable relative to the second optical element, a mechanism for moving the first optical element relative to the second optical element, and a rotatable element for operating the mechanism to change the magnification of the lens system. The camera further includes a view finder with adjustable magnification for providing a view representative of the image captured by the lens systems. The view finder includes first and second optical elements, the first element being moveable relative to the second element to change the magnification of the view finder and a mechanism for moving the first optical element relative to the second element.

37 Claims, 3 Drawing Sheets

CAMERA WITH MANUALLY OPERATED ZOOM LENS

FIELD OF THE INVENTION

This invention relates to cameras, and in particular to cameras with manually operated zoom lenses.

BACKGROUND OF THE INVENTION

Zoom lenses have been available for expensive, manually operated cameras for some time. These lenses are typically operated by sliding an element axially along the barrel of the lens to change the relative positions of the optical elements to increase and decrease the magnification. More recently, zoom lenses have been incorporated into less expensive automatic cameras that automatically change the relative positions of the optical elements to increase and decrease the magnification. However, zoom mechanisms have generally been too complicated and expensive to incorporate into inexpensive cameras. Moreover, in a compact, inexpensive camera, conventional zoom mechanisms did not provide adequate or accurate adjustment. Another difficulty in incorporating a zoom mechanism in an inexpensive camera is that such cameras typically have view finders, and it is difficult to inexpensively alter the view through the view finder to accurately reflect the image captured by the lens system.

SUMMARY OF THE INVENTION

The camera of the present invention includes a compact, inexpensive, manually operated zoom lens system. The magnification of the lens system is adjusted by manual rotation of a part of the lens systems. More specifically, the lens system has at least first and second optical elements, the first optical element being movable relative to the second optical element. The lens system also includes a mechanism for moving the first optical element relative to the second optical element, and a rotatable element for operating the mechanism to change the magnification of the lens system. Thus, manual rotation of the rotatable element changes the magnification of the lens system, so that magnification of the image can be quickly and accurately adjusted. The lens system also includes an inexpensive and simplified shutter mechanism and flash actuator.

In accordance with the preferred embodiment of this invention, the camera also includes a view finder which displays an image generally representative of the image captured by the lens system. This view finder is preferably automatically adjusted with the change in the magnification of the zoom lens system caused by rotation of the rotatable element. In the preferred embodiment, the view finder comprises first and second optical elements, the first element being moveable relative to the second element to change the magnification of the view finder. The view finder also comprises a mechanism for moving the first optical element relative to the second optical element. This mechanism is preferably connected to the lens system so that as the magnification of the lens system changes, the magnification of the view finder changes accordingly. In the preferred embodiment, the optical elements of the lens system and the optical elements of the view finder are constructed and arranged so that as the elements of the lens system move in one direction, the elements of the view finder move in the opposite direction to maintain the view through the view finder generally in accordance with the image captured by the lens system. Thus optical elements are selected so that as the first and second optical elements of the lens system move toward each other, the first and second optical elements of the view finder move away from each other, and vice versa.

Thus the camera of the present invention provides an inexpensive camera with a zoom lens that is simple and easy to use. The user can easily and accurately adjust the magnification of the lens system to change the image captured by the lens system. Moreover in the preferred embodiment, the image viewed through the viewfinder automatically changes with changes in the magnification in the lens system so that the view finder accurately reflects the image captured by the lens system, in a non-single lens reflex camera.

These and other features and advantages will be in part apparent, and in part pointed out hereinafter.

BRIEF DESCRIPTION OF THE DRAWINGS

FIG. 8 is an end view of the camera lens covering the photo aperture; and

FIG. 9 is an end view of the shutter blade and flash actuator.

Corresponding reference numerals indicate corresponding parts throughout the several views of the drawings.

DETAILED DESCRIPTION OF THE PREFERRED EMBODIMENT

Figure 1:
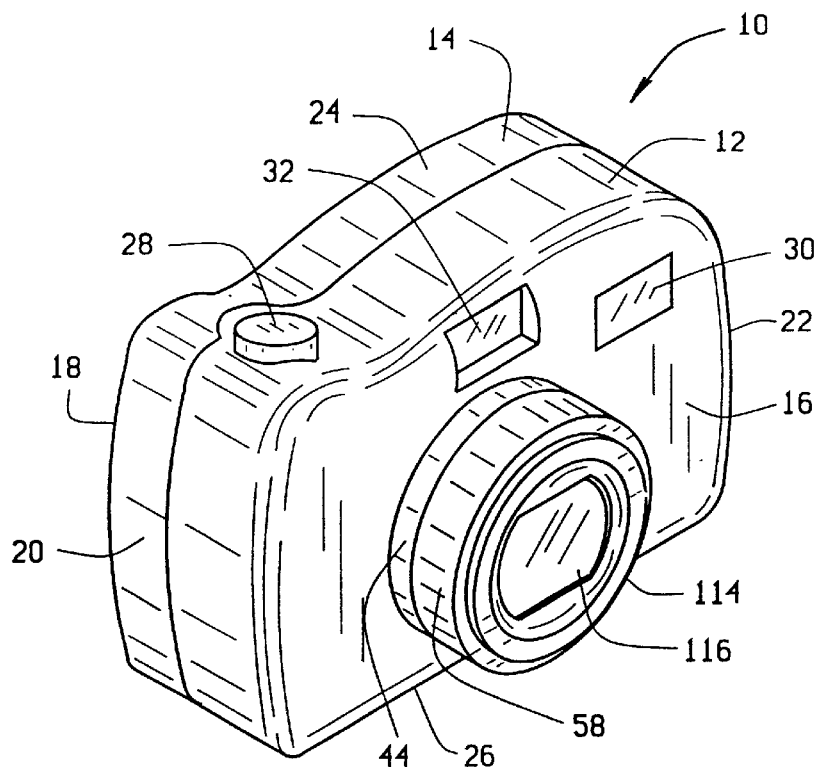
FIG. 1 is a perspective view of a camera with a manually adjustable zoom lens in accordance with the principles of the present invention, shown adjusted to minimum magnification.
Figure 2:
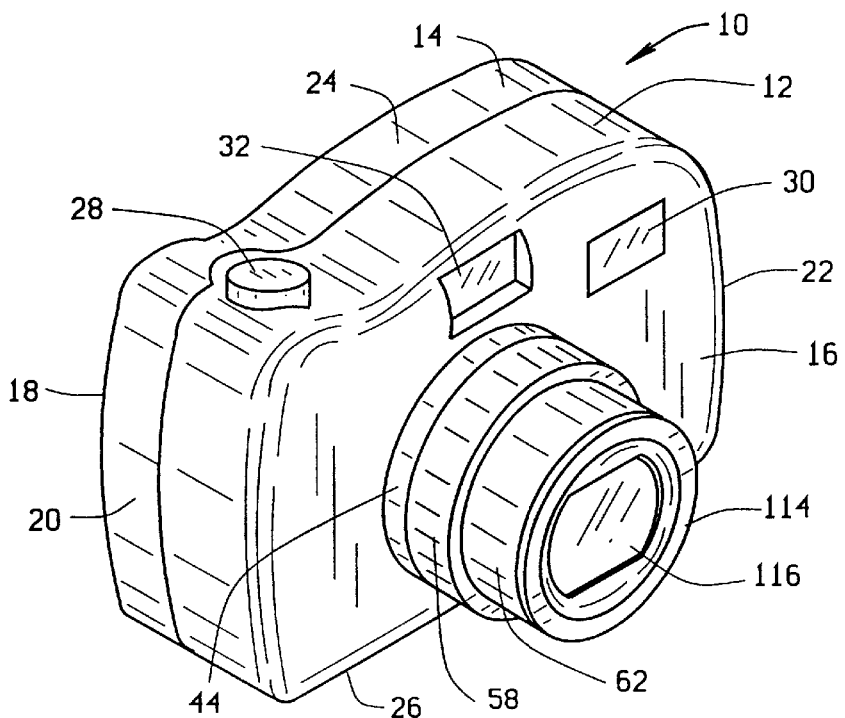
FIG. 2 is a perspective view of the camera, shown adjusted to the maximum magnification.

The manually operated zoom lens camera 10 of the invention is shown in FIGS. 1 and 2. For illustrative purposes the camera 10 that includes the inventive features of the invention is described as a conventional film camera, however the novel zoom lens system, view finder lens system and shutter mechanism and flash actuator of the invention that are employed in the camera to be described could be used in various different types of cameras including filmless digital cameras.

In the example of the camera shown in FIGS. 1 and 2, the camera 10 includes a camera body comprised of a front section 12 and a rear section 14 that enclose the internal components of the camera. In the preferred embodiment of the camera a majority of its component parts are constructed of plastic to reduce manufacturing costs. However, other materials may also be employed. The front section 12 and rear section 14 of the camera are secured together and together define a front surface 16, a rear surface 18, opposite left 20 and right 22 side surfaces and opposite top 24 and bottom 26 surfaces. The camera has an actuator button 28 on its top surface, a flash port 30 on its front surface, a view finder port 32 on its front surface and a zoom lens system 34 projecting from its front surface. The internal component parts of the camera that are not important to understanding the subject matter of the invention, for example the photo chamber and the film advancement system, are conventional and will not be described in detail.

Figure 3:
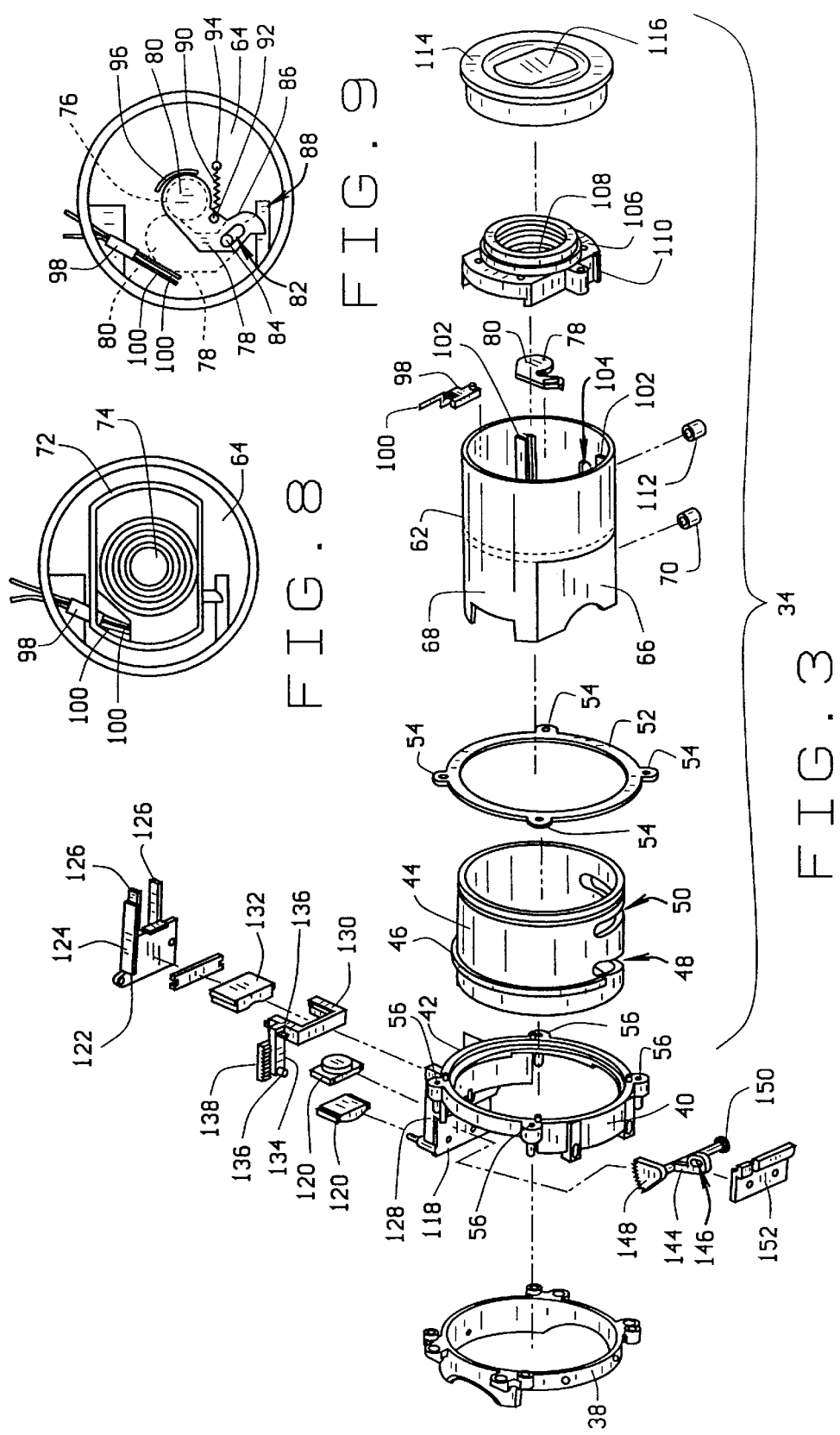
FIG. 3 is an exploded view of the parts comprising the lens and view finder systems of the camera.

FIG. 3 shows an exploded view of the component parts of the zoom lens system 34 of the invention. The zoom lens system 34 includes an annular camera body connector 38 that is secured in the interior of the camera body 10 around the photo chamber (not shown) of the camera. The term "photo chamber" as used herein is the enclosed chamber in the interior of the camera body through which film passes and is exposed to light on operation of the camera shutter to produce photographs. An annular base 40 of the lens system is secured to the body connector 38. The base 40 has a recessed circular shoulder 42 in a forwardly facing surface of the base.

Figure 4:
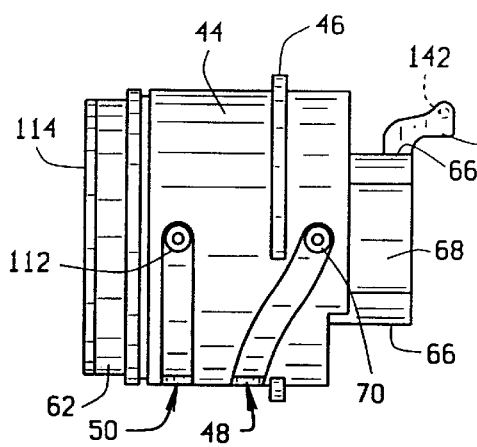
FIG. 4 is a right side elevation view of the lens system providing the adjustable magnification, adjusted to the minimum magnification (corresponding to FIG. 1)
Figure 6:
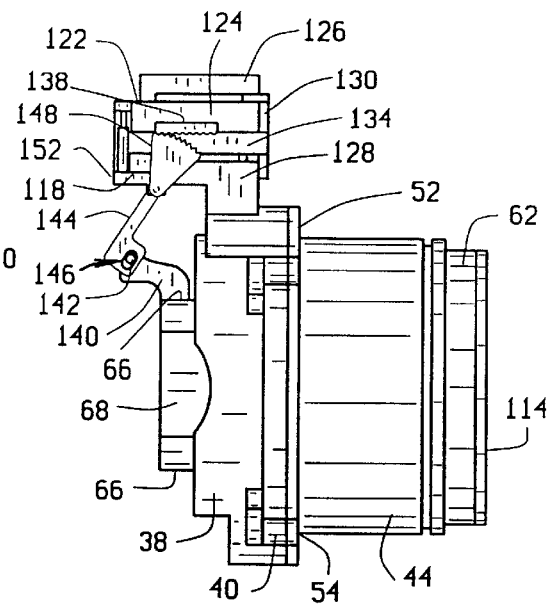
FIG. 6 is a left side elevation view of the lens system and view finder system providing the adjustable magnification of the captured image and the viewed image, adjusted to the minimum magnification (corresponding to FIGS. 1 and 4)

A zoom lens barrel 44 is mounted on the base 40 for rotational movement relative thereto. The zoom lens barrel 44 is cylindrical and has an annular ridge 46 that extends around a majority of the exterior of the barrel toward its rearward end. Adjacent the annular ridge 46 is a first curved slot 48 formed through the zoom lens barrel. The first slot 48 extends one quarter of the way around the zoom lens barrel 44 and curves in an axial direction as it extends around the barrel. A second curved slot 50 is also formed through the barrel 44. The second curved slot 50 is positioned more toward the forward end of the zoom lens barrel 44. The second slot 50 also extends one quarter of the way around the barrel and tapers axially slightly as it extends around the barrel. As best seen in FIGS. 4 and 6, the extent to which the first and second slots 48, 50 extend around the zoom lens barrel 44 is the same.

A ring cover 52 secures the zoom lens barrel 44 to the base 40. The zoom lens barrel 44 is inserted into the base 40 with the annular ridge 46 of the barrel received on the recessed circular shoulder 42 of the base. The ring cover 52 is then passed over the barrel 44 and is secured to the base 40 covering over the annular ridge 46 of the barrel. The ring cover 52 has four tabs 54 that align with screw holes 56 on the base and is secured to the base by threaded fasteners (not shown) passed through holes of the tabs 54 and into the screw holes 56 of the base. In this manner, the zoom lens barrel 44 is mounted to the base 40 for rotational movement of the barrel relative to the base. In the preferred embodiment of the invention stops (not shown) are provided in the base 40 to limit the extent of rotation of the zoom barrel lens 44 to one-quarter of a turn. Also in the preferred embodiment a flexible, annular grip 58 is mounted on the exterior of the zoom lens barrel 44 to provide a gripping surface for turning the barrel one-quarter turn in either direction. The annular grip 58 is shown in FIGS. 1 and 2.

A zoom lens tube 62 passes through the interior of the zoom lens barrel 44. The zoom lens tube has a shutter surface 64 that extends across the interior of the tube and divides the tube interior into two sections. Behind the shutter surface 64 the zoom lens tube 62 is not cylindrical but has opposite flat surfaces 66, only one of which can be seen in FIG. 3. Opposite arcuate surfaces 68 of the zoom lens tube extend between the opposite flat surfaces 66. The arcuate surfaces 68 and flat surfaces 66 of the tube are dimensioned to fit over complementary shaped surfaces of the photo chamber (not shown) of the camera to mount the zoom lens tube 62 to the photo chamber and the camera. This method of mounting the zoom lens tube 62 to the photo chamber enables the tube to slide axially rearwardly and forwardly with the opposite flat surfaces 66 of the tube preventing rotation of the tube relative to the camera.

A tube pin 70 is secured to the exterior surface of the zoom lens tube 62 and is positioned in the first curved slot 48 of the zoom lens barrel 44. Thus, on rotation of the zoom lens barrel 44 in opposite directions, the tube pin 70 passes through the first curved slot 48 of the barrel causing the zoom lens tube 62 to be moved forwardly and rearwardly relative to the camera body 10 due to the curvature of the first curved slot 48. The curvature of the first curved slot 48 will cause the zoom lens tube 62 to be moved forwardly from the zoom lens barrel 44 in response to the barrel being rotated in a counter clockwise direction as viewed in FIGS. 1 through 3. The curvature of the first slot 48 will also cause the zoom lens tube 62 to be moved rearwardly and retracted back into the zoom lens barrel 44 in response to the barrel being rotated in a clockwise direction as viewed in FIGS. 1 through 3. FIG. 1 shows the zoom lens tube 62 retracted into the zoom lens barrel 44 and FIG. 2 shows the zoom lens tube 62 extended from the zoom lens barrel 44.

The shutter surface 64 that extends across the interior of the zoom lens tube 62 can be seen in FIGS. 8 and 9 which are views into the forward end of the zoom lens tube 62. FIG. 8 shows a first or proximal photo lens frame 72 and lens 74 mounted on the shutter surface 64. The photo lens frame 72 positions the first or proximal photo lens 74 over the photo aperture 76 that is shown in dashed lines in FIG. 9. FIG. 9 shows the photo lens frame 72 and photo lens 74 removed from the shutter surface 64 to provide a better view of the shutter 78 of the camera.

The shutter 78 is mounted on the shutter surface 64 for movement between a closed position shown in solid lines in FIG. 9 and an open position shown in dashed lines in FIG. 9. The shutter 78 includes a blade 80 that is dimensioned to cover over the photo aperture 76 through the shutter surface 64 when the shutter is in the closed position. The shutter has an oblong slot 82 that is mounted over a post 84 on the shutter surface 64, thereby mounting the shutter for pivoting movement between its opened and closed positions. An actuator arm 86 of the shutter projects over a slot 88 through the shutter surface 64. When the actuator button 28 of the camera is depressed, an actuator mechanism (not shown) moves through the shutter surface slot 88 from the left to the right as shown in FIG. 9 and engages the actuator arm 86 of the shutter. As the mechanism moves to the right its engagement with the actuator arm 86 causes the shutter to pivot about the pivot post 84 moving the blade 80 away from and eventually displacing the blade from the photo aperture 76, thus taking a photograph. The actuator mechanism eventually moves past the shutter actuator arm 86 and a spring 90 connected between a post 92 on the shutter and a post 94 on the shutter surface 64 pulls the shutter back to its closed position. An arcuate wall 96 on the shutter surface 64 stops the movement of the shutter 78 due to the bias of the spring 90 and positions the shutter blade 80 over the photo aperture 76.

A flash switch 98 is also mounted on the shutter surface 64 adjacent the shutter 78. The flash switch 98 has a pair of electrical contacts 100 that project from the switch. The electrical contacts 100 are flexible and are positioned a slight distance away from each other. However, when the shutter 78 is moved toward its opened position the shutter blade 80 comes into contact with the electrical contacts 100 causing them to contact each other. This contact between the electrical contacts 100 of the flash switch 98 closes the switch and activates the flash mechanism of the camera. This closing of the flash switch 98 occurs just as the shutter 78 is coming to its opened position where it is completely displaced from the photo aperture 76 as depicted by the dashed line representation of the shutter shown in FIG. 9. The simplified shutter system and the manner in which it activates the flash switch 98 of the camera reduces the manufacturing costs of the camera.

Positioned on the interior surface of the zoom lens tube 62 forwardly of the shutter surface 64 are pairs of axially extending ribs 102 that define axial grooves therebetween. Also positioned in front of the shutter surface 64 and circumferentially positioned between the two pairs of axial ribs 102 is a straight slot 104 that extends axially along the zoom lens tube 62 for a short axial distance.

A photo lens frame 106 mounting a second or distal photo lens 108 is received in the zoom lens tube 62. The photo lens frame 106 has opposite flanges 110 (only one of which can be seen in FIG. 3) that are received in the grooves between the axial rib 102 on the interior of the zoom lens tube 62. This mounts the photo lens frame 106 for sliding movement in the interior of the zoom lens tube 62. A photo lens pin 112 is secured to the photo lens frame 106 and passes through the straight slot 104 of the zoom lens tube 62 and into the second tapered slot 50 of the zoom lens barrel 44. Thus, on rotation of the zoom lens barrel 44 in opposite directions, the photo lens pin 112 travels through the second slot 50 of the zoom lens barrel and moves the photo lens frame 106 forwardly and rearwardly relative to the zoom lens tube 62. The straight slot 102 in the zoom lens tube 62 holds the photo lens frame 110 against rotation as it is moved forwardly and rearwardly by rotation of the zoom lens barrel 44. In this manner, rotation of the zoom lens barrel 44 in opposite directions results in axial forward and rearward movement of the first photo lens 74 and the second photo lens 108 relative to the photo chamber (not shown) of the camera and also moves the first photo lens 74 and the second photo lens 108 forwardly and rearwardly relative to each other to produce the zooming in and zooming out function of the zoom lens system of the invention.

A circular zoom lens cover 114 with a zoom window 116 is fit over the forward end of the lens tube 62 to seal closed the lens tube and protect its interior components.

Figure 5:
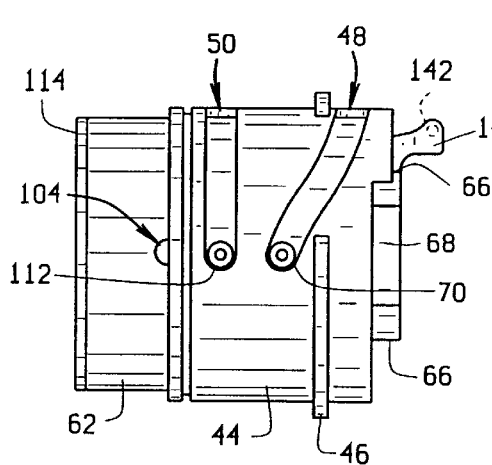
FIG. 5 is a right side elevation view of the lens system, adjusted to provide the maximum magnification (corresponding to FIG. 2)
Figure 7:
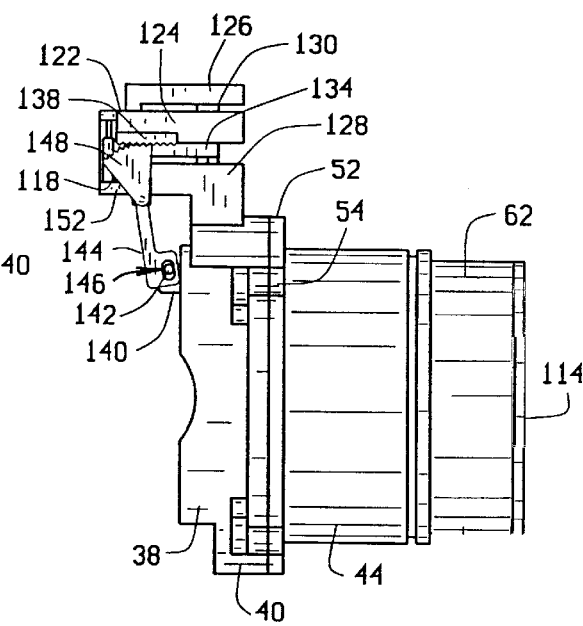
FIG. 7 is a left side elevation view of the lens system and view finder system, adjusted to the maximum magnification (corresponding to FIGS. 2 and 5)

The view finder lens system of the invention is mounted above the base 40 of the zoom lens system just behind the view finder port 32 of the camera. The view finder mechanism is shown in FIGS. 3, 5 and 7. The view finder lens system includes a stationary lens housing with a bottom surface 118 of the housing secured to the top of the zoom lens system base 40. The housing includes a pair of stationary viewing lenses 120 that are secured in the housing in a spaced relationship and are covered over by a top 122 of the view finder housing. The housing top 122 has a side guide arm 124 and a pair of top guide arms 126 that project axially forward from the housing top. A guide wall 128 having a guide slot (not shown) in its top surface is positioned at one side of the view finder housing.

Positioned in front of the view finder housing is a viewing lens frame 130 with a moveable viewing lens 132 mounted in the frame. An arm 134 projects rearwardly from the viewing lens frame 130 and a pair of pins 136 project downwardly from the arm 132 into the groove in the top surface of the guide wall 128. Thus, the frame arm 34 is mounted for axially forward and rearward movement between the guide wall 128 and the side guide arm 124 of the housing top wall. The axial movement of the frame arm 134 also causes the viewing lens frame 130 and the moveable viewing lens 132 it supports to move forwardly and rearwardly relative to the pair of stationary viewing lenses 120 in the view finder housing.

The viewing lens frame 130 is operatively connected to the zoom lens barrel 44 and, more specifically the zoom lens tube 62 by a linkage. The linkage includes a tooth rack 138 on the frame arm 134. It also includes an arm 140 having a pivot pin 142 that projects rearwardly from the zoom lens tube 62 as shown in FIGS. 5 and 7. Connecting the tube arm 140 to the frame arm 132 is a link 144 having a length with an opening 146 at one end and a gear segment 148 at its opposite end. A pivot shaft 150 projects from the link intermediate its opposite ends. A grooved plate 152 is secured to the bottom 118 of the view finder housing with the pivot shaft 150 of the link positioned between a groove in the plate 152 and the housing bottom 118, thereby mounting the link 144 for pivoting movement at the side of the view finder housing. The link opening 146 is received over the pin 142 of the tube arm 140 and the link gear segment 148 meshes with the tooth rack 138 of the moveable lens frame arm 134. Thus, on movement of the zoom lens tube 62 between its retracted position shown in FIG. 5 to its forward position shown in FIG. 7, the link 144 is caused to pivot counterclockwise as shown in FIGS. 5 and 7. This causes the gear segment 148 of the link to mesh with the tooth rack 138 of the moveable viewing lens frame arm 134 which in turn causes the moveable viewing lens 132 to move rearwardly toward the stationary lenses of the view finder. Opposite movement of the zoom lens tube 62 from its extended position shown in FIG. 7 to its retracted position shown in FIG. 5 causes the link 144 to pivot in a clockwise direction which in turn causes its gear segment 148 to move the tooth rack 138 and the moveable viewing lens 132 supported on the viewing lens frame 130 forwardly relative to the stationary lenses 120 of the view finder. In this manner, the zoom lens system and the view finder lens system of the invention work together to give the user of the camera an adjusted magnified view through the stationary lenses 120, the moveable viewing lens 132 and an exterior viewing lens 154 of the view finder that is representative of the zoomed lens image to be photographed on adjustment of the zoom lens system of the invention. Because the zoom lens system and the view finder lens system are interconnected by a simple, mechanical connection of only a few component parts, the cost of construction is reduced.

Although the novel features of the invention have been described above by referring to a specific embodiment of the invention, it should be understood that component parts of the invention could be changed slightly, for example employing a gear meshing with two tooth racks on the zoom lens tube 62 and the moveable viewing lens frame 130 in lieu of the link 144 described, without departing from the intent of the invention.

While the present invention has been described by reference to specific embodiments, it should be understood that modifications and variations of the invention may be constructed without departing from the scope of the invention defined in the following claims.

What is claimed is:

1. A zoom lens camera comprising:
   a camera body;
   a zoom lens barrel mounted for manual rotation on the camera body; the zoom lens barrel containing at least one photo lens that is operatively connected to the zoom lens barrel to be moved forwardly, away from the camera body and rearwardly, toward the camera body in response to the zoom lens barrel being manually rotated in opposite directions on the camera body; and a view finder mounted on the camera body, the view finder containing at least one moveable viewing lens that is operatively connected to the zoom lens barrel to be moved forwardly and rearwardly in response to the zoom lens barrel being rotated in opposite directions of rotation.

2. The zoom lens camera of claim 1, wherein:

the view finder includes a surface supporting the moveable viewing lens for movement of the moveable viewing lens forwardly and rearwardly relative to the surface.

3. The zoom lens camera of claim 2, wherein:

the view finder has at least one stationary viewing lens mounted on the surface and the moveable viewing lens is moveable toward and away from the at least one stationary viewing lens.

4. The zoom lens camera of claim 3, wherein:

the view finder includes a external viewing lens mounted on the camera body.

5. The zoom lens camera of claim 4, wherein:

the moveable viewing lens is positioned between the at least one stationary viewing lens and the external viewing lens.

6. The zoom lens camera of claim 2, wherein:

the view finder has at least two stationary viewing lenses mounted on the surface and the moveable viewing lenses is moveable toward and away from the at least two stationary viewing lenses.

7. The zoom lens camera of claim 1, wherein:

the moveable viewing lens is operatively connected to the zoom lens barrel and the photo lens in the zoom lens barrel to move rearwardly in response to the photo lens being moved forwardly by manual rotation of the zoom lens barrel in one direction, and to move forwardly in response to the photo lens being moved rearwardly by manual rotation of the zoom lens barrel in an opposite direction of rotation.

8. The zoom lens camera of claim 1, wherein:

a zoom lens tube is mounted to the camera body to prevent rotation of the zoom lens tube relative to the camera body and to permit linear reciprocating movement of the zoom lens tube forwardly and rearwardly relative to the camera body, the at least one photo lens is mounted in the zoom lens tube and the zoom lens tube extends through the zoom lens barrel.

9. The zoom lens camera of claim 8, wherein:

the zoom lens barrel has a curved slot and the zoom lens tube has a pin that projects into the slot whereby manual rotation of the zoom lens barrel in opposite directions causes the pin to follow the slot and move the zoom lens tube forwardly and rearwardly through the zoom lens barrel.

10. The zoom lens camera of claim 9, wherein:

the zoom lens barrel has a second curved slot, the zoom lens tube has a straight slot, and the at least one photo lens is mounted for forward and rearward movement in the zoom lens tube and has a photo lens pin that extends through the straight slot of the zoom lens tube and into the second curved slot of the zoom lens barrel, whereby the at least one photo lens is moved forwardly and rearwardly in the zoom lens tube in response to rotation of the zoom lens barrel in opposite directions.

11. The zoom lens camera of claim 10, wherein:

the zoom lens tube contains an additional photo lens that is mounted stationary to the zoom lens tube.

12. The zoom lens camera of claim 8, wherein:

the zoom lens tube is operatively connected to the moveable viewing lens by a pivoting linkage.

13. The zoom lens camera of claim 12, wherein:

the pivoting linkage includes a link having opposite ends and a pivot shaft mounting an intermediate portion of the link to the camera body whereby the opposite ends of the link pivot about the pivot shaft, one end of the link is connected to the zoom lens tube and a second end of the link is connected to the moveable viewing lens.

14. The zoom lens camera of claim 13, wherein:

a tooth rack is connected to the moveable viewing lens and the second end of the link has gear teeth that mesh with the tooth rack.

15. The zoom lens camera of claim 8, wherein:

the zoom lens tube contains a photo aperture and a shutter that is moveable between a closed position where the shutter closes over the aperture and an opened position where the shutter is displaced from the aperture.

16. The zoom lens camera of claim 15, wherein:

the zoom lens tube contains a flash switch.

17. The zoom lens camera of claim 16, wherein:

the flash switch is positioned adjacent the shutter where the shutter will close the switch when the shutter is moved to the opened position and where the shutter is displaced from the switch when the shutter is moved to the closed position, causing the switch to open.

18. A zoom lens camera comprising:

a zoom lens barrel mounted on the camera body for rotation in opposite directions;

a zoom lens tube mounted in the zoom lens barrel for linear reciprocating movement of the zoom lens tube forwardly and rearwardly relative to the camera body in response to rotation of the zoom lens barrel in opposite directions; and a photo aperture and a shutter in the zoom lens tube, the shutter being moveable between a closed position where the shutter closes over the aperture and an opened position where the shutter is displaced from the aperture.

19. The zoom lens camera of claim 18, wherein:

the zoom lens tube contains a flash switch.

20. The zoom lens camera of claim 19, wherein:

the flash switch is positioned adjacent the shutter where the shutter will contact and close the switch when the shutter is moved to the opened position and where the shutter is displaced from the switch when the shutter is moved to the closed position, causing the switch to open.

21. A zoom lens camera comprising:

a camera body;

a zoom lens barrel mounted for rotation on the camera body; the zoom lens barrel containing at least one photo lens that is operatively connected to the zoom lens barrel to be linearly reciprocated along a line of movement in response to the zoom lens barrel being rotated in opposite directions on the camera body; and a view finder mounted on the camera body, the view finder containing at least one moveable viewing lens that is operatively connected to the photo lens to be linearly reciprocated along a line of movement in response to the linear reciprocating movement of photo lens.

22. The zoom lens camera of claim 21, wherein:

the view finder includes a surface supporting the moveable viewing lens for movement of the moveable viewing lens forwardly and rearwardly relative to the surface.

23. The zoom lens camera of claim 22, wherein:

the view finder has at least one stationary viewing lens mounted on the surface and the moveable viewing lens is moveable toward and away from the at least one stationary viewing lens.

24. The zoom lens camera of claim 23, wherein:

the view finder includes an external viewing lens mounted on the camera body.

25. The zoom lens camera of claim 24, wherein:

the moveable viewing lens is positioned between the at least one stationary viewing lens and the external viewing lens.

26. The zoom lens camera of claim 22, wherein:

the view finder has at least two stationary viewing lenses mounted on the surface and the moveable viewing lenses is moveable toward and away from the at least two stationary viewing lenses.

27. The zoom lens camera of claim 21, wherein:

the moveable viewing lens is operatively connected to the photo lens in the zoom lens barrel to move rearwardly in response to the photo lens being moved forwardly by rotation of the zoom lens barrel in one direction, and to move forwardly in response to the photo lens being moved rearwardly by rotation of the zoom lens barrel in an opposite direction of rotation.

28. The zoom lens camera of claim 21, wherein:

a zoom lens tube is mounted to the camera body to prevent rotation of the zoom lens tube relative to the camera body and to permit linear reciprocating movement of the zoom lens tube forwardly and rearwardly relative to the camera body, the at least one photo lens is mounted in the zoom lens tube and the zoom lens tube extends through the zoom lens barrel.

29. The zoom lens camera of claim 28, wherein:

the zoom lens barrel has a curved slot and the zoom lens tube has a pin that projects into the slot whereby rotation of the zoom lens barrel in opposite directions causes the pin to follow the slot and move the zoom lens tube forwardly and rearwardly through the zoom lens barrel.

30. The zoom lens camera of claim 29, wherein:

the zoom lens barrel has a second curved slot, the zoom lens tube has a straight slot, and the at least one photo lens is mounted for forward and rearward movement in the zoom lens tube and has a photo lens pin that extends through the straight slot of the zoom lens tube and into the second curved slot of the zoom lens barrel, whereby the at least one photo lens is moved forwardly and rearwardly in the zoom lens tube in response to rotation of the zoom lens barrel in opposite directions.

31. The zoom lens camera of claim 30, wherein:

the zoom lens tube contains an additional photo lens that is mounted stationary to the zoom lens tube.

32. The zoom lens camera of claim 28, wherein:

the zoom lens tube is operatively connected to the moveable viewing lens by a pivoting linkage.

33. The zoom lens camera of claim 32, wherein:

the pivoting linkage includes a link having opposite ends and a pivot shaft mounting an intermediate portion of the link to the camera body whereby the opposite ends of the link pivot about the pivot shaft, one end of the link is connected to the zoom lens tube and a second end of the link is connected to the moveable viewing lens.

34. The zoom lens camera of claim 33, wherein:

a tooth rack is connected to the moveable viewing lens and the second end of the link has gear teeth that mesh with the tooth rack.

35. The zoom lens camera of claim 28, wherein:

the zoom lens tube contains a photo aperture and a shutter that is moveable between a closed position where the shutter closes over the aperture and an opened position where the shutter is displaced from the aperture.

36. The zoom lens camera of claim 35, wherein:

the zoom lens tube contains a flash switch.

37. The zoom lens camera of claim 36, wherein:

the flash switch is positioned adjacent the shutter where the shutter will contact and close the switch when the shutter is moved to the opened position and where the shutter is displaced from the switch when the shutter is moved to the closed position, causing the switch to open.

\* \* \* \* \*